United States Patent Office 2,778,919
Patented Jan. 22, 1957

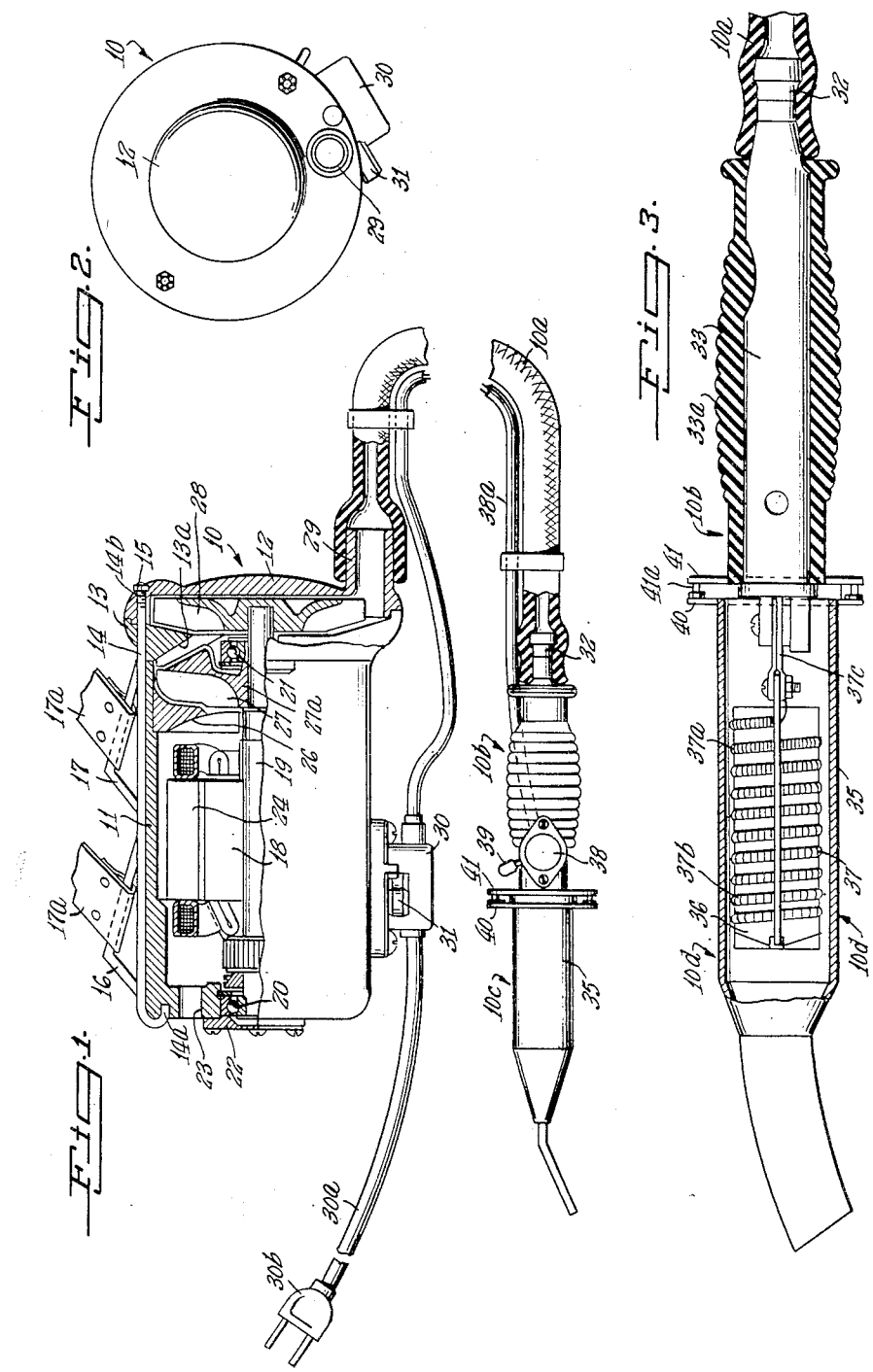

2,778,919

APPARATUS FOR SHAPING OR WELDING THERMOPLASTIC MATERIALS

Pierino Vicario, Cassano d'Adda, Italy, assignor to Gerd Lester, Chappaqua, N. Y.

Application December 27, 1955, Serial No. 555,690

Claims priority, application Italy December 30, 1954

7 Claims. (Cl. 219—39)

My invention relates to a hot air blower for the shaping or welding of thermoplastic materials such as sheets, tubes and rods of polyvinyl chloride or polyethylene.

It is an object of my invention to devise an apparatus of this type which, by virtue of a particular arrangement and design of the various component parts, is completely portable and more readily workable by the user than those heretofore available.

A further object of my invention is to provide a portable apparatus of the above nature which includes its own source of compressed air and hence can be used wherever a supply of electric current is available.

To achieve these objects, and in accordance with my invention, I connect a portable electric blower, preferably of the enclosed double-stage type for relatively high pressure, with a manually operable heater nozzle by means of a flexible connection formed by an air-pressure hose and an electric cord so that the blower unit can be accommodated on the body of the user while the heater nozzle is being manipulated by him. I further supply current through a flexible connecting cord to the blower and thence, through the cord of the above-mentioned flexible connection, to the heater; and I preferably control the blower as well as the heater by a common control switch mounted on the blower unit so as to be readily accessible by the operator's hand holding the nozzle unit.

According to other features of my invention I provide the blower unit with a portable strap means for supporting the electric blower and adapted to be slung over the operator's shoulder or otherwise secured to the operator's body, and design the nozzle member for selective attachment of exchangeable hot-air nozzle tubes adapted to respectively different operations such as welding and hot bending of the plastic material.

These and other features of my invention are set forth with particularity in the appended claims. The invention itself, however, and other objects and advantages thereof will be understood from the following description of a preferred embodiment when read in conjunction with the accompanying drawing, wherein:

Fig. 1 is a side view, with portions broken away, of the portable hot air blower apparatus embodying the invention equipped with a small orifice air outlet nozzle for welding;

Fig. 2 is an end view of the blower motor shown in Fig. 1; and

Fig. 3 is an enlarged view, partly in section, of the nozzle end of the air hose shown in Fig. 1 fitted with a nozzle having a large orifice air outlet nozzle for shaping purposes.

Referring now to the drawing in detail, the numeral 10 in Fig. 1 designates generally the air electric blower, 10a the flexible interconnecting air hose, 10b the handle and heater unit, and 10c the exchangeable air nozzle removably fitted to the handle and heater unit.

The electric blower 10 comprises a casing 11 provided with an end cover 12 attached thereto through an interposed intermediate member 13 by tie rods 14. For this purpose the tie rods 14 are provided at their ends with hooks 14a and screw-threaded portions 14b on which nuts 15 are threaded. The casing 11 has secured thereto buckles 16, 17 anchoring the ends of shoulder straps 17a (partially shown) provided for fastening the electric blower 10 to the operator. The rotor 18 of the blower drive motor is keyed to a shaft 19 supported by end roller bearings 20, 21. The bearing 20 is protected by an end cover 22.

Air, drawn through holes 23 (only one shown) bored in the end wall of the casing 11, and passing through the clearance spaces between poles 24 on the stator, is deflected inwardly by a stationary baffle 26 and pressurized by blades 27 of a centrifugal blower 27a keyed to the shaft 19. The pressurized air is then directed inwardly by a stationary baffle 13a provided on the intermediate member 13 and fed to a second centrifugal blower 28 from which it is discharged to an outlet nipple 29 formed in the end cover 12.

A switch 30 secured to the motor casing 11 and having an operating lever 31 is provided for starting the motor. A line cord 30a leading to the switch 30 and having an electrical plug 30b for connection with the usual service receptacle supplies electrical power for operating the apparatus.

Compressed air supplied at the outlet nipple 29 is conveyed by the flexible hose 10a to a nipple 32 at one end of the handle and heater unit 10b. Air flows through a tubular conduit 33 (see Fig. 3) within an insulated handle 33a and is supplied to a casing portion 35 of the removable air nozzle 10c.

The handle and heater unit 10b comprises a support of refractory material 36 about which a helical resistance wire heating element, generally denoted by 37, is wound. The heating element has turns of gradually increasing pitch, more particularly turns closer to one another at the portion 37a nearest the air inlet side, and turns wider apart at the portion 37b nearest the air outlet side, in order to provide for the gradual heating of air as it flows through the resistor 37, resulting in hotter operating conditions at the portion 37b of the heater element as compared with its portion 37a. Unless this precaution is taken, the heater wire will attain at 37b an excessive temperature, and may rapidly burn out.

The heating element 37 is fixed at its inner end to the outer end of the tubular conduit 33 by a flexible support arm 37c serving as one of the electric conductors to the heating element. The current feeding the resistor 37 is supplied through a conductor line 38a arranged parallel with the air supply hose and controlled by means of a switch 38 having an operating lever 39. The switch 38 is provided for cutting out the heating resistor in case unheated air is desired for cooling purposes.

The nozzle 10c is connected to the handle 10b by means of pairs of flanges having interconnection pins 41a. The flanges 40, 41 are adapted to intercept heat and prevent it from reaching the control handle 10b and are easily disconnectable for replacing a nozzle, such as for replacing the nozzle 10c with a nozzle 10d as illustrated in Fig. 3. As explained above, the smaller nozzle 10c is particularly adaptable for welding operations, whereas the larger nozzle 10d, providing a larger volume of cooler air over a greater area, is particularly suitable for softening thermoplastic materials as required for shaping or working the material.

I claim:

1. A portable air heater for shaping and welding thermoplastic materials, comprising a portable electric air blower, means for supporting the electric blower on the operator's body to allow free use of the operator's hands, an electrical heater unit, a handle connected with said heater unit and heat-insulated therefrom, a nozzle member surrounding said heater unit and removably connected with said handle, a flexible hose interconnecting said air blower with said handle, and air channel means in said handle allowing passage of compressed air through said hose handle past said heater unit and out said nozzle member.

2. Portable hot air apparatus for working thermoplastic materials, comprising a two-stage electric air compressor having an outlet, means for supporting said air compressor on the body of the operator, a flexible hose connected at one end to said outlet of said air compressor, an electrical heating element, a hollow handle member supporting said heating element, and an air outlet nozzle removably secured to one end of said handle member in surrounding relation to said heating element, the other end of said hose being connected to the other end of said handle member to direct pressurized air through said handle member over said heating element and out said nozzle member.

3. Portable hot air apparatus for working thermoplastic materials, comprising a two-stage electric air compressor having a pressurized air outlet, means for supporting said air compressor on the body of the operator, a flexible hose connected at one end to said outlet of said air compressor, an elongated electrical heating unit, said heating unit comprising a helical winding increasing in pitch from one end to the other, a hollow handle member supporting said heating element at said one end, and an air outlet nozzle removably secured to one end of said handle member in surrounding relation to said heating unit, the other end of said hose being connected to the other end of said handle member to direct pressurized air through said handle member, over said heating unit and out said nozzle member.

4. Portable hot air apparatus for working thermoplastic materials, comprising a two-stage electric air compressor having a pressurized air outlet, means for supporting said air compressor on the body of the operator, a flexible hose connected at one end to said outlet of said air compressor, an elongated electrical heating unit, said heating unit comprising a helical winding increasing in pitch from one end to the other, a hollow handle member supporting said heating element at said one end, an air outlet nozzle removably secured to one end of said handle member in surrounding relation to said heating unit, the other end of said hose being connected to the other end of said handle member to direct pressurized air through said handle member, over said heating unit and out said nozzle member, and electrical connection means for supplying power to said electric compressor and said heating unit including a switch on said electric compressor simultaneously controlling power to both said electric compressor and said heating unit and a switch on said handle member controlling power to said heating unit only.

5. Apparatus as claimed in claim 1 wherein the air blower comprises a rotating armature and a plurality of centrifugal air impellers arranged in series and keyed directly on said armature shaft.

6. Apparatus as claimed in claim 1 wherein the air blower comprises a rotating armature, and further including two air impellers arranged in series and keyed directly on said armature shaft, and an air baffle interposed between said impellers, said baffle being operative to oppose the whirling air movement caused by the impellers and return compressed air issuing from the first impeller towards the center of the second impeller.

7. The invention as defined in claim 1 wherein the means for removably connecting said nozzle member with said handle comprises a pair of heat deflecting flanges interposed with heat insulating material, said handle being provided with a gripping sleeve of heat insulating material.

References Cited in the file of this patent

UNITED STATES PATENTS

| | | |
|---|---|---|
| 2,031,391 | Spielman | Feb. 18, 1936 |
| 2,096,023 | Albertson | Oct. 19, 1937 |
| 2,267,264 | Bland | Dec. 23, 1941 |
| 2,372,737 | Phillips | Apr. 3, 1945 |